United States Patent
Oikawa

(10) Patent No.: US 9,023,982 B2
(45) Date of Patent: May 5, 2015

(54) METHOD FOR PURIFYING RESIN FOR PHOTOLITHOGRAPHY

(71) Applicant: Maruzen Petrochemical Co., Ltd., Tokyo (JP)

(72) Inventor: Tomo Oikawa, Ichihara (JP)

(73) Assignee: Maruzen Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 14/071,977

(22) Filed: Nov. 5, 2013

(65) Prior Publication Data

US 2014/0155564 A1 Jun. 5, 2014

(30) Foreign Application Priority Data

Dec. 4, 2012 (JP) ................. 2012-265529

(51) Int. Cl.
| | | |
|---|---|---|
| *C08G 63/02* | (2006.01) | |
| *C08F 220/10* | (2006.01) | |
| *C08F 232/08* | (2006.01) | |
| *C08G 64/00* | (2006.01) | |
| *C08F 6/28* | (2006.01) | |

(52) U.S. Cl.
CPC ............. *C08F 220/10* (2013.01); *C08F 232/08* (2013.01); *C08F 6/28* (2013.01)

(58) Field of Classification Search
USPC ............. 355/30, 52, 53, 67, 77; 430/5, 270.1; 528/499
See application file for complete search history.

(56) References Cited

U.S. PATENT DOCUMENTS 4,510,304 A * 4/1985 Hadermann .................. 528/481

\* cited by examiner

*Primary Examiner* — Terressa Boykin
(74) *Attorney, Agent, or Firm* — Burr & Brown, PLLC

(57) ABSTRACT

A method is provided for purifying a resin for photolithography wherein, from an insufficiently purified resin (also referred to as "crude resin"), low molecular weight impurities such as an unreacted monomer and a polymerization initiator, which cause a development defect of a resist pattern or deterioration of the storage stability of the resin for photolithography can be removed more effectively. The method for purifying a resin for photolithography includes an operation (a) wherein a slurry in which a resin is dispersed in a solution containing a good solvent and a poor solvent is stirred, and then an operation (b) wherein, to said slurry, a poor solvent is added to lower the ratio of the good solvent to the poor solvent, and then, the resin is separated from the solution.

16 Claims, No Drawings

METHOD FOR PURIFYING RESIN FOR PHOTOLITHOGRAPHY

BACKGROUND OF THE INVENTION

1. Field of the Invention

The present invention relates to a method for purifying a resin for photolithography, and a method for producing a resin for photolithography including the purification method. More specifically, the present invention relates to a method for purifying a resin for photolithography including an operation for purifying a polymerization solution after polymerization reaction and a method for producing a resin for photolithography including the purification method.

2. Description of Related Art

In photolithography, formation of a finer pattern is increasingly demanded due to increase in the integration density, and, at present, photolithography techniques with KrF excimer laser light (with a wave length of 248 nm) or ArF excimer laser light (with a wavelength of 193 nm) are used for mass production. A fine processing in an order of about not more than 50 nm is said to be possible by combining an excimer laser and an immersion lithography technique. Further, research and development are in progress also for photolithography techniques using F2 excimer laser light, which has a shorter wavelength (a wavelength of 157 nm), EUV (extreme ultraviolet) and X-ray, which have still shorter wavelengths than those excimer lasers, and the electron beam.

As miniaturization of the patterns proceeds, a higher quality has been demanded for a resin to be used for photolithography. For example, in cases where the resin contains low molecular weight impurities such as an unreacted monomer or a compound derived from polymerization initiator, the impurities cause a development defect of a resist pattern or deterioration of the storage stability of the resin, and are desired to be removed. As a method of removing low molecular weight impurities, a method (JP-A-2005-002236 (Patent Document 1)) is known wherein a reaction solution containing an acid decomposable resin having an alicyclic group obtained by radical polymerization reaction is brought into contact with a solvent which hardly dissolves or does not dissolve the resin in an amount less than five times the amount of the reaction solution by volume to precipitate a resin solid. Also known is a method (JP-A-2006-070167 (Patent Document 2)) wherein a polymer containing a monomer unit having a group exhibiting alkali-soluble function by partial detachment thereof by an acid is subjected to precipitation by an organic solvent, then further to a re-precipitation by aqueous solvent, a rinsing or repulping operation. Further, a method (JP-A-2008-127462 (Patent Document 3)) wherein, to a solution (a) containing a resin whose solution rate with respect to an alkaline developer is increased by the effect of an acid, a solvent (b) containing a poor solvent is added to prepare a solution (c), and then, the solution (c) is added to a solvent (d) containing a poor solvent to precipitate a resin whose solution rate with respect to an alkaline developer is increased by the effect of an acid (JP-A-2008-127462 (Patent Document 3)) or the like is known. In the methods of Patent Document 1 and Patent Document 2, however, the capability of removing low molecular weight impurities is not sufficient. In order to compensate for the insufficiency, since increase in frequency of purification or the like is needed, there are problems in that, for example, this method increases the manufacturing cost such as the number of manufacturing steps or the amount of solvent to be used. The method of Patent Document 3 include a step wherein, to a polymerization solution, a poor solvent is dropped. In such an operation wherein, to a large amount of resin solution, a poor solvent is added by a method such as dropping, a viscous resin which is hard to be confirmed by visual inspection may deposit and adhere to a wall of a container or the like.

SUMMARY OF THE INVENTION

The present invention was made in view of the above-mentioned background art, and an object of the present invention is to provide a method for producing a resin for photolithography wherein, from an insufficiently purified resin (also referred to as "crude resin"), low molecular weight impurities such as an unreacted monomer and a polymerization initiator can be removed more effectively.

In order to solve the above-mentioned problems, the present inventors intensively studied to discover that purification can be more effectively performed by devising the procedure in a step wherein a monomer which is a unit of the resin and a polymerization initiator are dissolved in an organic solvent and polymerized in a solution state, then the polymerization solution is added to a poor solvent to precipitate a resin to be filtrated, and further, the precipitated resin is rinsed by a solvent, thereby removing low molecular weight impurities.

In other words, according to one aspect of the present invention, provided is a method for purifying a resin for photolithography, the method comprising:

an operation (a) wherein a slurry in which a resin is dispersed in a solution containing a good solvent and a poor solvent is stirred; and then an operation (b) wherein, to said slurry, a poor solvent is added to lower the ratio of the good solvent to the poor solvent, and then, the resin is separated from the solution.

In one aspect of the present invention, the resin in the operation (a) may be obtained from a polymerization solution after polymerization reaction.

In one aspect of the present invention, the operation (a) may be an operation wherein a slurry which is obtained by bringing a polymerization solution after polymerization reaction into contact with a poor solvent is stirred.

In one aspect of the present invention, the operation (a) may be an operation wherein a slurry which is obtained by bringing a polymerization solution after polymerization reaction into contact with a poor solvent is stirred, and in the operation (b), the amount of poor solvent to be added to the slurry may be not less than 20% by weight of the total amount of the poor solvent to be used in the operation (a) and operation (b).

In one aspect of the present invention, the operation (a) may be an operation wherein a slurry obtained by mixing a resin with a solution containing a good solvent and a poor solvent is stirred, wherein said resin is obtained by solid-liquid separating a precipitate obtained by bringing a polymerization solution after polymerization reaction into contact with a poor solvent.

In one aspect of the present invention, the operation (a) may be an operation wherein a slurry obtained by mixing a resin with a solution containing a good solvent and a poor solvent is stirred, wherein said resin is obtained by solid-liquid separating a precipitate obtained by bringing a polymerization solution after polymerization reaction into contact with a poor solvent, and the amount of poor solvent to be added in the operation (b) may be not less than 40% by weight of the total amount of poor solvents to be used in the operation (a) and the operation (b).

In one aspect of the present invention, the poor solvent to be added in the operation (b) may comprise water.

In one aspect of the present invention, said resin may be in powder form.

According to another aspect of the present invention, provided is a method for producing a resin for photolithography, said method comprising the above-mentioned method for purifying a resin for photolithography.

According to the present invention, a method for purifying a resin for photolithography wherein low molecular weight impurities can be more effectively removed with a smaller workload and by using a smaller amount of solvent to be used can be provided. Further, a method for producing a resin for photolithography comprising the purification method can be provided.

DETAILED DESCRIPTION OF THE INVENTION

Embodiments of the present invention are described below, but the present invention is not restricted to the embodiments below, and it should be understood that these embodiments are included within the scope of the present invention even in cases where they are, for example, appropriately modified or improved without departing from the spirit of the present invention based on the normal knowledge of those skilled in the art.

(A Method for Producing a Resin for Photolithography)

A method for producing a resin for photolithography according to the present invention comprises the below-mentioned method for purifying a resin for photolithography. In the method for producing a resin for photolithography according to the present invention, the structure of a resin for photolithography or a polymerization step is not particularly restricted and those which is conventionally known can be used.

A resin for photolithography which is produced by a production method according to the present invention is not particularly restricted, and examples thereof include a resin for a resist, a resin for an underlayer film, a resin for an antireflection film, a resin for topcoat, and a resin for gap filling.

Examples of a resin for a chemically amplified positive resist include those having a repeating unit having a structure which is protected by a group (hereinafter, also referred to as "acid-dissociable dissolution-inhibitive group") which dissociates an alkali-soluble group such as a carboxyl group or a phenolic hydroxyl group by the action of an acid such as acetal or a tertiary hydrocarbon group. When a KrF excimer laser is used for an exposure light source, preferred are those having a repeating unit derived from hydroxystyrene, or a repeating unit of a phenolic hydroxyl group derived from hydroxystyrene protected by an acid-dissociable dissolution-inhibitive group. When an ArF excimer laser is used for an exposure light source, preferred are those having a repeating unit of a carboxyl group derived from an (α-alkyl)acrylic acid which has a small extinction coefficient for the wavelength of 193 nm protected by an acid-dissociable dissolution-inhibitive group. In order to increase the adherence to a semiconductor substrate or the like, or in order to adjust the solubility to a lithography solvent or an alkaline developer, preferred are those having a repeating unit having a lactone structure or a polar group such as a hydroxyl group. Further, in order to adjust the solubility to a lithography solvent or an alkaline developer, the resin may, as needed, have a repeating unit or the like having a group (hereinafter, also referred to as "acid-stable and dissolution inhibiting structure") which inhibits the dissolution to an alkaline developer and at same time does not dissociate by the action of an acid.

Examples of the resin for an antireflection film include those having a repeating unit having an aromatic ring such as a benzene ring, a naphthalene ring and an anthracene ring as a functional group for increasing the extinction coefficient or the refractive index for the wavelength of 248 nm or 193 nm. Further, in order to avoid mixing with a resist film, the resin may, as needed, have a repeating unit having a reactive functional group such as an amino group, an amide group, a hydroxyl group, and an epoxy group which can be reacted with a curing agent or the like to be cured.

These resins can be synthesized by a monomer or the like having a styrene, acrylate, norbornene skeleton or the like having an ethylenic double bond to which a variety of substituents may be attached. Examples of the styrene skeleton having an ethylenic double bond include styrene and vinyl naphthalene; examples of the acrylate skeleton having an ethylenic double bond include an acrylic acid or a methacrylic acid, or acrylate, methacrylate or the like which is derived therefrom; and examples of the norbornene skeleton having an ethylenic double bond include norbornene, tricyclodecene and tetracyclododecene.

Examples of the alkali-soluble group include a carboxyl group, a phenolic hydroxyl group, a hydroxy fluoroalkyl group, and sulfo group. Among these, a carboxyl group, a phenolic hydroxyl group, and a hydroxy fluoroalkyl group are preferred. Specific example of a monomer which provides a repeating unit having such a group include carboxylic acids having an ethylenic double bond such as an acrylic acid, a methacrylic acid, a maleic acid, a fumaric acid, an α-trifluoromethyl acrylic acid, a 5-norbornene-2-carboxylic acid, a 2-trifluoromethyl-5-norbornene-2-carboxylic acid, carboxytetracyclo[4.4.0.1$^{2,5}$.1$^{7,10}$]dodecyl methacrylate; monomers having a phenolic hydroxyl group such as p-hydroxystyrene, m-hydroxystyrene, p-hydroxy-α-methyl styrene, 2-hydroxy-6-vinyl naphthalene; monomers having a hydroxy fluoroalkyl group such as p-(2-hydroxy-1,1,1,3,3,3-hexafluoro-2-propyl)styrene, 5-(2-hydroxy-1,1,1,3,3,3-hexafluoro-2-propyl)methyl-2-norbornyl-(meth)acrylate, 5-(2-hydroxy-1,1,1,3,3,3-hexafluoro-2-propyl)methyl-2-norbornene.

For the acid-dissociable dissolution-inhibitive group, a tertiary hydrocarbon group or a group forming an acetal structure is desired, and specific examples thereof include saturated hydrocarbon groups such as a tert-butyl group, a tert-amyl group, a 1-methyl-1-cyclopentyl group, a 1-ethyl-1-cyclopentyl group, a 1-methyl-1-cyclohexyl group, a 1-ethyl-1-cyclohexyl group, a 2-methyl-2-adamantyl group, a 2-ethyl-2-adamantyl group, a 2-propyl-2-adamantyl group, a 2-(1-adamantyl)-2-propyl group, an 8-methyl-8-tricyclo[5.2.1.0$^{2,6}$]decanyl group, an 8-ethyl-8-tricyclo[5.2.1.0$^{2,6}$]decanyl group, an 8-methyl-8-tetracyclo[4.4.0.1$^{2,5}$.1$^{7,10}$]dodecanyl group, or an 8-ethyl-8-tetracyclo[4.4.0.1$^{2,5}$.1$^{7,10}$]dodecanyl group; oxygen-containing hydrocarbon groups such as a 1-methoxyethyl group, a 1-ethoxyethyl group, a 1-iso-propoxyethyl group, 1-n-butoxyethyl group, 1-tert-butoxyethyl group, 1-cyclopentyloxyethyl group, 1-cyclohexyloxyethyl group, 1-tricyclo[5.2.1.0$^{2,6}$]decanyloxyethyl group, methoxymethyl group, ethoxymethyl group, iso-propoxy methyl group, n-butoxymethyl group, tert-butoxymethyl group, cyclopentyloxymethyl group, cyclohexyloxymethyl group, tricyclo[5.2.1.0$^{2,6}$]decanyloxymethyl group, 2-tetrahydrofuranyl group, or 2-tetrahydropyranyl group.

The repeating unit having a structure in which an alkali-soluble group is protected by an acid-dissociable dissolution-inhibitive group can be obtained by polymerizing the above-mentioned monomer having an alkali-soluble group, the monomer having a structure in which a hydrogen atom in the alkali-soluble group is substituted with an acid-dissociable dissolution-inhibitive group. Alternatively, after the monomer having an alkali-soluble group is polymerized, the polymer is reacted with vinyl ether or halide alkyl ether under an acid catalyst to introduce an acid-dissociable dissolution-inhibitive group.

Examples of a polar group for increasing the adherence to a semiconductor substrate or the like include a group having a lactone structure, an alcoholic hydroxyl group, a group having an ether structure, or a nitrile group. Among these, a group having a lactone structure, or an alcoholic hydroxyl group is preferred. Specific examples of the group having a lactone structure include a substituent containing a lactone structure such as γ-butyrolactone, γ-valerolactone, δ-valerolactone, 1,3-cyclohexane carbolactone, 2,6-norbornane carbolactone, 4-oxa tricyclo[5.2.1.02,6]decane-3-one, or mevalonic acid δ-lactone. Specific examples of the alcoholic hydroxyl group include hydroxy alkyl groups such as a hydroxy methyl group, a hydroxy ethyl group, a hydroxy propyl group, a 3-hydroxy-1-adamantyl group, and a 3,5-dihydroxy-1-adamantyl group.

Specific examples of the acid-stable and dissolution inhibiting group include a methyl group, an ethyl group, a cyclopentyl group, a cyclohexyl group, an isobornyl group, a 1-adamantyl group, a 2-adamantyl group, a tricyclo[5.2.1.02, 6]decanyl group, a tetracyclo[4.4.0.12,5.17,10]dodecyl group, a benzyl group, and a 9-anthracene methyl group. The repeating unit having an acid-stable group for adjusting the solubility to a lithography solvent or an alkaline developer can be obtained by polymerizing the above-mentioned monomer having an alkali-soluble group, the monomer having a structure in which a hydrogen atom in the alkali-soluble group is substituted with an acid-stable and dissolution inhibiting group.

Examples of other repeating units having a similar effect to that of a repeating unit having an acid-stable and dissolution inhibiting group include those having a structure obtained by polymerizing a non-polar monomer having an ethylenic double bond such as styrene, α-methyl styrene, vinyl naphthalene, indene, acenaphthylene, norbornene, tricyclodecene, and tetracyclododecene.

(Polymerization Step)

A polymerization step in the manufacturing method of the present invention is not particularly restricted, and a conventionally known polymerization method such as radical polymerization, cationic polymerization, living anionic polymerization, and ring opening polymerization can be applied.

In a method of radical polymerization, the polymerization step is performed by dissolving a raw material monomer, a radical polymerization initiator, and an optional chain transfer agent or the like in a solvent, and heating under stirring preferably under an inert gas atmosphere such as nitrogen. For example, the polymerization step can be performed by a so-called lump polymerization in which all raw materials such as a monomer, a polymerization initiator, and a chain transfer agent are dissolved in a solvent and heated to a polymerization temperature; a method wherein a monomer is dissolved in a solvent and heated to a polymerization temperature, followed by adding a polymerization initiator or the like; a so-called dropping polymerization method wherein a solution obtained by dissolving a monomer, a polymerization initiator or the like in a solvent is dropped onto a solvent which has been heated to a polymerization temperature; or the like. Among these methods, the dropping polymerization method is preferred since the reproducibility per a production lot is high. In particular, a so-called independent dropping method in which a monomer and a polymerization initiator which is a radical source are independently dropped is preferred. A part of the monomer, the polymerization initiator, the chain transfer agent and the like can be provided in a polymerization system in advance. In the dropping method, by changing the composition of the individual feed solution or the feeding speed depending on the concentration and the composition, and the radical concentration of the monomer in the polymerization system, the molecular weight distribution or the composition distribution of the copolymer can be controlled.

Examples of the radical polymerization initiator which can be used include azoic polymerization initiators such as azoisobutyronitrile, 2,2'-azobis(methyl 2-methylpropionate); and peroxide polymerization initiators such as benzoyl peroxide. The azoic polymerization initiator is preferred since it is excellent in safety in handling. Note that some azoic polymerization initiator contains a large amount of metal impurities, which may negatively affect the resist performance or the like. In such cases, it is desired that metal impurities be removed in advance by extracting a solution obtained by dissolving a polymerization initiator in an organic solvent or the like by a water solvent, or bringing the solution into contact with a filter having a function of capturing an ion-exchange resin or a metal.

In terms of the chain transfer agent, a known chain transfer agent may be employed as required. A thiol compound is especially preferred, and may be selected from a wide variety of known thiol compounds. The amount of the chain transfer agent to be used may be selected based on the desired molecular weight; types of monomers, polymerization initiator, chain transfer agent, solvent and/or the like; composition of repeating units; polymerization temperature; drop rate; and/or the like.

The solvent to be used for polymerization reaction is not particularly restricted as long as the solvent can stably dissolve a monomer, a polymerization initiator, a chain transfer agent, and a polymerization reaction product. As the polymerization solvent, a wide variety of solvent such as water, ketones, alcohols, ether alcohol, esters, ether esters, ethers, aromatic hydrocarbons, N,N-dimethylformamide, and acetonitrile may be used. These may be used either alone or as a mixture of two or more thereof.

The amount of the polymerization solvent to be used is not restricted, and in cases where the amount of the solvent used is too small, monomers may deposit and/or the viscosity of the solution is too high to keep the polymerization system uniform. In cases where the amount of the solvent used is too large, there are cases where the degree of conversion of the monomers is insufficient and/or the molecular weight of the copolymer cannot be increased to the desired value. The amount of the polymerization solvent to be used is normally 0.5 to 20 parts by weight, preferably 1 to 10 parts by weight with respect to 1 part by weight of monomers.

The amount of the polymerization solvent to be initially filled in the reaction vessel (which may be hereinafter referred to as the initially filled solvent) is sufficient as long as the amount is not less than the lowest amount at which the resulting solution can be stirred, while in cases where the amount is unnecessarily large, the amount of the monomer solution which can be supplied is small and hence the production efficiency is low, which is not preferred. The amount of the initially filled solvent is usually selected within the range of, for example, not less than 1/30, preferably 1/20 to 1/2, especially preferably 1/10 to 1/3, in terms of the volume ratio with respect to the final filled amount (that is, the total amount of the initially filled solvent, and the monomer solution and the initiator solution to be dropped). A part of the monomers and/or the polymerization initiator may be preliminarily mixed with the initially filled solvent.

When the dropping time is short, molecular weight distribution is likely to be broad, and the temperature of the polymerization solution is reduced due to dropping of a large amount of the solution at one time, which is not preferred. On the contrary, when the dropping time is long, the copolymer is subjected to an excessive thermal history and productivity is reduced, which is not preferred. Therefore, the dropping time is ordinary selected from the range of 0.5 to 24 hours, preferably 1 to 12 hours, especially preferably 2 to 8 hours.

After completion of dropwise addition, it is preferable that the residual unreacted monomer be reacted by carrying out aging by maintaining the temperature for a certain period of time, by further heating or the like. When the aging time is too long, production efficiency per hour is decreased, and the copolymer is subjected to an excessive thermal history, which is not preferred. Therefore, the aging time is ordinary selected from the range of not more than 12 hours, preferably not more than 6 hours, especially preferably 1 to 4 hours.

The polymerization temperature may be appropriately selected based on the boiling points of the solvent, monomers, chain transfer agent and the like; the half-life temperature of the polymerization initiator; and the like. The polymerization temperature is preferably selected within the range of 40 to 160° C., especially preferably 60 to 120° C. Since the polymerization temperature largely influences the molecular weight of the copolymer and the copolymer composition, the temperature should be precisely controlled. On the other hand, the polymerization reaction is generally an exothermic reaction, so that it is difficult to keep the temperature constant. Thus, preferably, one or more types of compounds having boiling points close to the polymerization temperature of interest are included as a polymerization solvent(s) and the polymerization temperature is set to not less than the initial boiling points of the compounds. By this method, increase in the polymerization temperature can be suppressed by the latent heat of vaporization of the polymerization solvent(s).

The polymerization pressure may be appropriately set, but, since nitrogen gas in the case of the azo system or oxygen gas in the case of the peroxide system is generated when radicals are generated from the initiator, the polymerization is preferably performed under a pressure near atmospheric pressure by setting the polymerization system to be an open system, in order to suppress fluctuation of the polymerization pressure.

(Method for Purifying a Resin for Photolithography)

The method for purifying a resin for photolithography of the present invention is characterized by comprising: an operation (a): an operation wherein a slurry in which a resin is dispersed in a solution containing a good solvent and a poor solvent is stirred, and then, an operation (b): an operation wherein a poor solvent is added to said slurry to lower the ratio of the good solvent to the poor solvent (good solvent/poor solvent), and then, the resin is separated from the solution. According to the purification method of the present invention, with a smaller workload and by using a smaller amount of solvent, low molecular weight impurities such as a polymerization solvent, an unreacted monomer, an oligomer, a polymerization initiator or a chain transfer agent, and reaction byproducts thereof can be effectively removed. Usually, a resin obtained by polymerization contains such low molecular weight impurities. By removing such low molecular weight impurities by purification, the resin can be suitably used in a lithography in which a fine pattern is formed. In the purification method of the present invention, the operation (a) and operation (b) may be applied to the below-mentioned precipitation purification, to the below-mentioned rinse purification, or to both thereof.

(Precipitation Purification)

In the precipitation purification, a polymerization reaction solution is brought into contact with a poor solvent to precipitate a resin, and impurities are extracted into a poor solvent layer, and then the precipitated resin is separated from a liquid by a method such as filtration, decantation, or centrifugation. In the present invention, low molecular weight impurities can be removed by a precipitation purification including the above-mentioned operation (a) and operation (b). Specifically, operation (a): a slurry in which a polymerization solution after polymerization reaction, diluted by adding thereto a good solvent as required, is brought into contact with a poor solvent to precipitate a resin is stirred, and impurities are extracted into a poor solvent phase. Next, operation (b): a poor solvent in an amount of not less than 20% by weight, preferably not less than 20% by weight and not more than 80% by weight of the total amount of the poor solvent to be used in the operation (a) and operation (b) is added to the slurry to lower the ratio of the good solvent to the poor solvent, and then, a precipitated resin is separated from the solvent by a method such as filtration, decantation, or centrifugation.

Although the amount of poor solvent to be used in the precipitation purification is not particularly restricted as long as a resin can be separated from low molecular weight impurities, the resin is preferably precipitated in a powder form. It is desired that the precipitation purification be performed under a condition in which a precipitate does not aggregate or become sticky, and in which separation operation such as filtration can be easily performed. For this reason, it is important to know an appropriate amount of a poor solvent to be used. In the following, experimental procedures 1 to 5 to provide an indication for the amount of poor solvent used for precipitation purification are described.

(Experimental Procedures)

1. A plurality of glass vessels having a lid are prepared, and a poor solvent in amounts varied in a range of twice to five times, or twice to ten times the amount of crude resin solution to be used is put thereinto.
2. A crude resin solution in a predetermined amount (several grams) is put into each vessel in procedure 1, and after a lid is put the vessel, the solution is agitated to precipitate a resin.
3. When there exists a large particle resin, it is pulverized by a spoon or the like into small pieces.
4. The vessel is left to stand still under a purification operation temperature for one day to observe by visual inspection the state of the resin based on the evaluations below.

Evaluation A: A resin in powder form is not aggregated. Supernatant liquid is substantially transparent.

Evaluation B: A part of a resin in powder form is aggregated.

Evaluation C: A resin is solidified.

Evaluation D: A resin is solidified within 30 minutes from the start of being left to stand still.

Evaluation E: A resin is not precipitated in powder form, and is precipitated in aggregate form.

Evaluation F: The precipitation amount is apparently small

Evaluation G: The liquid is emulsified.

5. By using the amount of poor solvent which can receive the evaluation A, the amount of poor solvent to be used for the actual precipitation purification is calculated.

Generally, the larger amount of the poor solvent, the more likely the resin in powder form is to be precipitated, and the less likely the resin is to be aggregated. On the other hand, the smaller the amount of the poor solvent, the more likely the resin is to be aggregated and solidified, or emulsified.

Further, in view of ease of handling of the subsequent filtration, in order to prevent clogging on the surface of filtration, it is preferred that a large amount of poor solvent for precipitation purification be used, and that the resin to be precipitated be not aggregated. On the other hand, since the amount of the solvent is preferably small in view of the cost, the smallest amount of the poor solvent which can receive the evaluation A in the above-mentioned experiment is preferably used.

In the precipitation purification to which the present invention is applied, at first, a part of the amount of the poor solvent determined in the above-mentioned procedures 1 to 5, concretely, the poor solvent in an amount equivalent to evaluation B or C in the above-mentioned experiment is added to a purification tank. A polymerization solution is added to the poor solvent while sufficiently stirring the poor solvent in the purification tank to precipitate a resin, and the stirring is continued after the addition of the polymerization solution. By this, even when the amount of the poor solvent is equivalent to the above-mentioned evaluation B or C, aggregation of the resin can be prevented. After stirring the slurry for a predetermined time, the poor solvent is further added to the slurry until the amount of the poor solvent reaches the amount equivalent to the above-mentioned evaluation A. During the addition of the additional poor solvent, and also after the completion of the addition thereof, the stirring is preferably continued for a predetermined time. By separating the precipitated resin from a solvent by a method such as filtration, decantation, or centrifugation, a wet cake can be obtained.

(Rinse Purification)

The wet cake obtained by the above-mentioned precipitation purification is preferably further rinsed by a poor solvent in order to further reduce the low molecular weight impurities. The poor solvent used for the rinse purification may contain a good solvent for the resin. In the present invention, by a rinse purification comprising the above-mentioned operation (a) and operation (b), low molecular weight impurities can be removed. Specifically, operation (a): a slurry obtained by mixing a resin with a solution containing a good solvent and a poor solvent is stirred, wherein said resin is obtained by solid-liquid separating a precipitate obtained by bringing a polymerization solution after polymerization reaction into contact with a poor solvent, thereby extracting impurities in a poor solvent phase. Next, operation (b): a poor solvent in an amount of not less than 40% by weight, preferably not less than 40% by weight and not more than 80% by weight of the total amount of the poor solvent to be used in the operation (a) and operation (b) is added to the slurry to lower the ratio of the good solvent to the poor solvent, and then, a resin is separated from the solvent by a method such as filtration, decantation, or centrifugation.

In the rinse purification to which the present invention is applied, the wet case after the precipitation purification is returned to the purification tank, and, at first, a poor solvent is added thereto and the mixture is stirred in slurry state, and then a good solvent is further added thereto and the mixture is stirred for a predetermined time. The ratio of the good solvent to the poor solvent at this time may be determined by referring to the ratio thereof when the resin is first precipitated in the above-mentioned precipitation purification. After stirring the slurry for a predetermined time, the poor solvent is further added thereto. The amount of the poor solvent to be added is also such that the ratio of the good solvent to the poor solvent is the same as or a little smaller than that after the addition of the poor solvent in the above-mentioned precipitation purification. During the addition of the additional poor solvent, and also after the completion of the addition, the stirring is preferably continued for a predetermined time. The resin in powder form in the slurry is separated from the poor solvent by a method such as filtration, decantation, or centrifugation.

By the precipitation purification and/or rinse purification of the present invention, low molecular weight impurities in a resin can be effectively removed. This is assumed to be because since, in the precipitation purification, a resin is precipitated in a state in which the ratio of a good solvent to a poor solvent is high, it is prevented that the resin precipitates as a large particle and incorporates low molecular weight impurities therein, and impurities can be sufficiently extracted by a solvent; because, also in the rinse purification, by rinsing the resin in a state in which the ratio of the good solvent to the poor solvent is high, impurities can be sufficiently extracted by a solvent; or the like. In either case, by adding a poor solvent before the solid-liquid separation, and reducing the ratio of the good solvent to the poor solvent, the stickiness of the resin or the aggregation of the resin can be prevented, and the subsequent filtration operation can be easily performed.

the term "poor solvent" herein refers to a solvent in which when a resin 1 g is dissolved in a solvent 10 g, the amount of resin dissolved is not more than 0.2 g. The type of the poor solvent is not particularly restricted as long as the solvent can precipitate a resin and can separate the low molecular weight impurities. The type of the poor solvent can be appropriately selected depending on the solubility of a resin to a poor solvent, the type and the amount of a solvent used for polymerization, the type, the amount and the like of impurities. Examples of the poor solvent include compounds having a hydroxyl group such as water, methanol, ethanol, isopropanol, ethylene glycol, ethyl lactate; linear, branched, or cyclic saturated hydrocarbons such as pentane, n-hexane, iso-hexane, n-heptane, cyclopentane, ethyl cyclohexane; or aromatic hydrocarbons such as toluene and xylene. These solvents may be used either alone or as a combination of two or more of these solvents.

The term "good solvent" herein refers to a solvent whose solubility to a resin is more excellent than that of a poor solvent. Examples of the type of a good solvent include solvents illustrated in the above-mentioned polymerization solvent or the below-mentioned solvent for film formation. These solvents may be used either alone or as a combination of two or more of these solvents.

Since the temperature in the purification step largely affects the weight average molecular weight, molecular weight distribution of the resin, the removal ratio of low molecular weight impurities, and in addition, a variety of performances in lithography, the temperature is needed to be strictly controlled. When the temperature of purification step is too low, the extraction of impurities to a purification solvent becomes insufficient and the removal of impurities is not sufficiently attained, which is not efficient; on the contrary, when the temperature of purification step is too high, a copolymer is eluted by the purification solvent, and the composition balance in the low molecular region of the copolymer is disrupted, or the yield thereof is reduced, which are not preferred. For these reasons, the purification step is preferably performed in a temperature range of 0 to 40° C., preferably 0 to 30° C.

The resin after purification may be dried and taken out; alternatively, the resin may be dissolved in a good solvent again, and then, the solvent may be replaced with a solvent suitable for a lithography resin composition. A method of the replacement is performed by heating the resin solution under reduced pressure to distill off low boiling point substances such as a solvent used for purification, and, while providing thereto a solvent for film formation, by distilling off the early stage solvent and the provided solvent together.

The temperature during the heating under reduced pressure is not restricted as long as the copolymer is not deteriorated at the temperature, and, usually, the temperature is preferably not more than 100° C., more preferably not more than 80° C., still more preferably not more than 70° C., especially preferably not more than 60° C.

In the replacement of the solvent, in cases where the amount of the solvent for film coating supplied later is too small, low boiling point compounds cannot be sufficiently removed, and in cases where the amount is too large, the substitution takes a long time and the thermal history of the copolymer is unnecessarily long, which is not preferred. The amount of the solvent to be supplied may be selected within the range of 1.05 to 10 times, preferably 1.1 to 5 times, especially preferably 1.2 to 3 times the necessary amount of the solvent for the finished solution.

The solvent for film formation is not restricted as long as the solvent can dissolve the copolymer, and usually selected in consideration of the boiling point, influences on the coating films of the semiconductor substrate and the like, and absorbance of the radiation used for lithography. Examples of solvents commonly used for film formation include propylene glycol monomethyl ether acetate, propylene glycol monomethyl ether, propylene glycol n-butyl ether, dipropylene glycol n-propyl ether, dipropylene glycol n-butyl ether, ethyl lactate, methyl amyl ketone, γ-butyrolactone, cyclohexanone and 4-methyl-2-pentanol.

Further, the step of removal of metal impurities from the copolymer is preferably performed. In this step, the copolymer solution is allowed to pass through a filter having cation-exchange capacity or a filter comprising a substance having a positive zeta potential, such as polyamide polyamine epichlorohydrin cationic resin. These steps may be carried out in combination.

Specific examples of the filter comprising a substance having a positive zeta potential, such as polyamide polyamine epichlorohydrin cationic resin, include Zeta Plus 40 QSH, Zeta Plus 020 GN and LifeASSURE EF Series (registered trademarks) manufactured by CUNO INC.

Further, in order to remove microgels such as high polymers, which may cause pattern defects of resists and hence are not preferred, the copolymer solution (or the solution for film formation) is preferably filtered through a filter. The filtration accuracy of the filter is not more than 0.2 μm, preferably not more than 0.1 μm, especially preferably not more than 0.05 μm. Examples of the material of the filter include polyolefins such as polyethylene and polypropylene, polar group-containing resins such as polyamide, polyester and polyacrylonitrile; and fluorine-containing resins such as polyethylene fluoride. The material of the filter is preferably polyamide. Examples of the polyamide filter include Ultipleat P-Nylon 66 and Ultipor N66 manufactured by Pall Corporation, and LifeASSURE PSN Series and LifeASSURE EF Series manufactured by CUNO INC (registered trademarks). Examples of the polyolefin filter include Microguard Plus HC10 and Optimizer D manufactured by Nihon Entegris K.K. These filters may be used either alone or as a combination of two or more of the filters.

EXAMPLE

Embodiments of the present invention are described more concretely by way of Examples below. However, the present invention is not restricted at all to the Examples.

Monomers used for the Examples are shown below.
E: 2-ethyl-2-adamantyl methacrylate
I: 2-isopropyl-2-adamantyl methacrylate
C: 1-methyl-1-cyclopentyl methacrylate
Ad: (2-adamantyloxy)methyl methacrylate
Na: 3,5-norbornane lactone-2-yl acrylate
N: 3,5-norbornane lactone-2-yl methacrylate
G: γ-butyrolactone-α-methacrylate
O: 3-hydroxy-1-adamantyl methacrylate
(Residual Monomer Concentration in Resin)

The concentration of residual monomer in the polymerization solution or the resin was analyzed by high performance liquid chromatography. 0.10 g of a polymerization solution after polymerization reaction and wet cake obtained in each step of purification were dissolved in 1 ml of tetrahydrofuran to prepare a sample for analysis. The amount of each sample injected into an apparatus was 5 μl.

Apparatus: GPC8220 manufactured by Tosoh Corporation
Detector: differential refractive index (RI) detector
Column: TSKgel SuperHZ1000 (×4) manufactured by Tosoh Corporation
Eluent: tetrahydrofuran
(Weight Average Molecular Weight and Dispersivity of Resin)

The weight average molecular weight (Mw) and dispersivity (Mw/Mn) of a resin were determined by gel permeation chromatography using polystyrene as a standard preparation. For the analysis of a polymerization solution after polymerization reaction, 0.10 g of polymerization solution was dissolved in 1 ml of tetrahydrofuran to prepare a sample for analysis. The amount of each sample injected into an apparatus was 60 μl. For the analysis of resin after purification and drying, 0.02 g of powder was dissolved in 1 ml of tetrahydrofuran to prepare a sample for analysis. The amount of each sample injected into an apparatus was 60 μl.

Apparatus: manufactured by Tosoh Corporation GPC8220
Detector: differential refractive index (RI) detector
Column: KF-804L (×3) manufactured by Showa Denko K.K.
Eluent: tetrahydrofuran
(Copolymer Composition of Resin)

The copolymer composition of a resin was analyzed by $^{13}$C-NMR. 1 g of resin after purification and drying and 0.1 g of Cr(III) acetylacetonate were dissolved in a mixed solvent of 1.5 g of deuterated acetone and 0.5 g of methyl ethyl ketone to prepare a sample for analysis.

Apparatus: AVANCE400 manufactured by Bruker Corporation
Nuclide: $^{13}$C
Method of measurement: Inverse gated decoupling
Integration times: 6000 times
Measurement tube diameter: 10 mmφ

Synthesis Example 1

156 g of monomer Na (norbornane lactone acrylate) and 186 g of monomer E (2-ethyl-2-adamantyl methacrylate) are dissolved in 440 g of methyl ethyl ketone to prepare a homogeneous monomer solution. 8.6 g of 2,2-dimethyl azobis(m-ethylpropionate) was dissolved in 90 g of methyl ethyl ketone to prepare a homogeneous polymerization initiator solution. Into a Pyrex (registered trademark) 2 L four-necked flask reaction vessel equipped with a stirrer and a condenser, 300 g of methyl ethyl ketone was fed, and after keeping the inside of the reaction vessel under nitrogen atmosphere, methyl ethyl ketone in the reaction vessel was heated to a temperature of 79° C. The monomer solution and polymerization initiator solution which were maintained at room temperature (about 25° C.) were each supplied dropwisely to a reaction vessel which was maintained at 79 to 81° C. at a constant rate over four hours each by using a metering pump. After the dropwise addition was completed, the solution was further aged for two hours while maintaining the temperature at 79 to 81° C., and then cooled to room temperature and a polymerization solution was taken out. A part of the polymerization solution was sampled and subjected to GPC analysis to obtain the results: Mw=8100, Mw/Mn=2.05.

Further, by using a part of the polymerization solution, a test for determining the amount of a poor solvent to be used for precipitation purification was performed. Into four screw cap vials, 4 g, 6 g, 8 g, and 10 g (twice, three times, four times, and five times the amount of a polymerization solution to be processed) of methanol were put as a poor solvent; 2 g of polymerization solution in the Synthesis Example 1 was added to each of the vials; and then, the vials were agitated to precipitate a resin, and further, a large particle was pulverized by a metal spoon into small pieces. The state of the resin after being left to stand still for one day at room temperature was observed. When the amount of methanol was 4 g, the resin was aggregated in a lump. When the amount of methanol was 6 g, a part of the resin was aggregated. When the amount of methanol was 8 g or 10 g, the resin in powder form was precipitated, but not aggregated. Therefore, for precipitation purification, methanol in an amount which is four times the amount of the polymerization solution was to be employed as a poor solvent.

Example 1

(Precipitation purification) To a purification vessel, 440 g of methanol was added and, while stirring with a stirrer, 200 g of polymerization solution of Synthesis Example 1 was poured thereinto to precipitate a resin in powder form, followed by stirring for 15 minutes. Then, 360 g of methanol was added and further stirred for 15 minutes. This was filtrated to obtain a wet cake, which was referred to as WC1.
(Rinse purification (first time)) The wet cake WC1 was returned to the purification vessel again, and 160 g of methanol and 40 g of methyl ethyl ketone were poured thereinto in the order mentioned and stirred for 15 minutes, then 200 g of methanol was further added and stirred for 15 minutes. This was filtrated to obtain a wet cake, which was referred to as WC2.
(Rinse purification (second time)) The same operation as the rinse purification (first time) was performed. The obtained wet cake was referred to as WC3.

The amounts of the poor solvent used in the precipitation purification, rinse purification (first time) and rinse purification (second time) are listed on Table 1.

A part of each of the wet cakes WC1, WC2, and WC3 was sampled, and the amount of residual monomer in each process was analyzed by LC analysis. The analysis results are listed on Table 2. The wet cake WC3 was dried under reduced pressure at 40° C. to obtain a dried resin. For the monomer composition ratio of the obtained resin, the analysis results of Mw and Mw/Mn are listed on Table 3.

Comparative Example 1

(Precipitation purification) To a purification vessel, 800 g of methanol was added and, while stirring with a stirrer, 200 g of polymerization solution of Synthesis Example 1 was poured thereinto to precipitate a resin in powder form, followed by stirring for 30 minutes. This was filtrated to obtain a wet cake, which was referred to as WC1.
(Rinse purification (first time)) The wet cake WC1 was returned to the purification vessel again, and 360 g of methanol and 40 g of methyl ethyl ketone were poured thereinto in the order mentioned and stirred for 30 minutes. This was filtrated to obtain a wet cake, which was referred to as WC2.
(Rinse purification (second time)) The same operation as the rinse purification (first time) was performed. The obtained wet cake was referred to as WC3.

The amounts of the poor solvent used in the precipitation purification, rinse purification (first time) and rinse purification (second time) are listed on Table 1.

A part of each of the wet cakes WC1, WC2, and WC3 was sampled, and the amount of residual monomer in each process was analyzed by LC analysis. The analysis results are listed on Table 2. The wet cake WC3 was dried under reduced pressure at 40° C. to obtain a dried resin. For the monomer composition ratio of the obtained resin, the analysis results of Mw and Mw/Mn are listed on Table 3.

Synthesis Example 2

82 g of monomer G (gamma butyrolactone methacrylate), 71 g of monomer N (norbornane lactone methacrylate), 140 g of monomer Ad ((2-adamantyloxy)methyl methacrylate), 57 g of monomer O (3-hydroxy-1-adamantyl methacrylate) are dissolved in 480 g of methyl ethyl ketone to prepare a homogeneous monomer solution. 18.4 g of 2,2-dimethyl azobis (methylpropionate) was dissolved in 80 g of methyl ethyl ketone to prepare a homogeneous polymerization initiator solution. Into a Pyrex (registered trademark) 2 L four-necked flask reaction vessel equipped with a stirrer and a condenser, 237 g of methyl ethyl ketone was fed, and after keeping the inside of the reaction vessel under nitrogen atmosphere, methyl ethyl ketone in the reaction vessel was heated to a temperature of 79° C. The monomer solution and polymerization initiator solution which were maintained at room temperature (about 25° C.) were each supplied dropwisely to a reaction vessel which was maintained at 79 to 81° C. at a constant rate over three hours each by using a metering pump. After the dropwise addition was completed, the solution was further aged for two hours while maintaining the temperature at 79 to 81° C., and then cooled to room temperature and a polymerization solution was taken out. A part of the polymerization solution was sampled and subjected to an analysis to obtain the results: Mw=9300, Mw/Mn=2.04, and the amount of residual monomer 3.33% by weight.

Further, by using a part of the polymerization solution, a test for determining the amount of a poor solvent to be used for precipitation purification was performed. Into four screw cap vials, 4 g, 6 g, 8 g, and 10 g (twice, three times, four times, and five times the amount of a polymerization solution to be processed) of hexane were put as a poor solvent; 2 g of polymerization solution in the Synthesis Example 1 was added to each of the vials; and then, the vials were agitated to precipitate a resin, and further, a large particle was pulverized by a metal spoon into small pieces. The state of the resin after being left to stand still for one day at room temperature was observed. When the amount of hexane was 4 g, the resin was aggregated in a lump. When the amount of hexane was 6 g, a part of the resin was aggregated. When the amount of hexane was 8 g or 10 g, the resin in powder form was precipitated, but not aggregated. Therefore, for precipitation purification, hexane in an amount which is four times the amount of the crude resin (polymerization solution) was to be employed as a poor solvent.

Example 2

(Precipitation purification) To a purification vessel, 440 g of hexane was added and, while stirring with a stirrer, 200 g of polymerization solution of Synthesis Example 1 was poured thereinto to precipitate a resin in powder form, followed by stirring for 15 minutes. Then, 360 g of hexane was added and further stirred for 15 minutes. This was filtrated to obtain a wet cake, which was referred to as WC1.
(Rinse purification (first time)) The wet cake WC1 was returned to the purification vessel again, and 160 g of hexane and 40 g of methyl ethyl ketone were poured thereinto in the order mentioned and stirred for 15 minutes, then 200 g of hexane was further added and stirred for 15 minutes. This was filtrated to obtain a wet cake, which was referred to as WC2.
(Rinse purification (second time)) The same operation as the rinse purification (first time) was performed. The obtained wet cake was referred to as WC3.

The amounts of the poor solvent used in the precipitation purification, rinse purification (first time) and rinse purification (second time) are listed on Table 1.

A part of each of the wet cakes WC1, WC2, and WC3 was sampled, and the amount of residual monomer in each process was analyzed by LC analysis. The analysis results are listed on Table 2. The wet cake WC3 was dried under reduced pressure at 40° C. to obtain a dried resin. For the monomer composition ratio of the obtained resin, the analysis results of Mw and Mw/Mn are listed on Table 3.

Comparative Example 2

(Precipitation purification) To a purification vessel, 800 g of hexane was added and, while stirring with a stirrer, 200 g of polymerization solution of Synthesis Example 1 was poured thereinto to precipitate a resin in powder form, followed by stirring for 30 minutes. This was filtrated to obtain a wet cake, which was referred to as WC1.
(Rinse purification (first time)) The wet cake WC1 was returned to the purification vessel again, and 360 g of hexane and 40 g of methyl ethyl ketone were poured thereinto in the order mentioned and stirred for 30 minutes. This was filtrated to obtain a wet cake, which was referred to as WC2.
(Rinse purification (second time)) The same operation as the rinse purification (first time) was performed. The obtained wet cake was referred to as WC3.

The amounts of the poor solvent used in the precipitation purification, rinse purification (first time) and rinse purification (second time) are listed on Table 1.

A part of each of the wet cakes WC1, WC2, and WC3 was sampled, and the amount of residual monomer in each process was analyzed by LC analysis. The analysis results are listed on Table 2. The wet cake WC3 was dried under reduced pressure at 40° C. to obtain a dried resin. For the monomer composition ratio of the obtained resin, the analysis results of Mw and Mw/Mn are listed on Table 3.

Synthesis Example 3

110 g of monomer G (gamma butyrolactone methacrylate), 68 g of monomer O (3-hydroxy-1-adamantyl methacrylate) are dissolved in 300 g of methyl ethyl ketone to prepare a homogeneous monomer solution. 16.6 g of 2,2-dimethyl azobis(methylpropionate) was dissolved in 90 g of methyl ethyl ketone to prepare a homogeneous polymerization initiator solution. Into a Pyrex (registered trademark) 2 L four-necked flask reaction vessel equipped with a stirrer and a condenser, 200 g of methyl ethyl ketone and 226 g of monomer I (2-isopropyl-2-adamantyl methacrylate) were fed, and after making the solvent homogeneous and keeping the inside of the reaction vessel under nitrogen atmosphere, the solution in the reaction vessel was heated to a temperature of 79° C. The monomer solution and polymerization initiator solution which were maintained at a temperature of about 25° C. were each supplied dropwisely from another storage vessel to a reaction vessel which was maintained at 79 to 81° C. at a constant rate over three hours each by using a metering pump. After the dropwise addition was completed, the solution was further aged for two hours while maintaining the temperature at 79 to 81° C., and then cooled to room temperature and a polymerization solution was taken out. A part of the polymerization solution was sampled and subjected to an analysis to obtain the results: Mw=7300, Mw/Mn=2.09, and the amount of residual monomer was 19.0% by weight.

Further, by using a part of the polymerization solution, a test for determining the amount of a poor solvent to be used for precipitation purification was performed. Into five screw cap vials, 4 g, 6 g, 8 g, and 10 g (twice, three times, four times, and five times the amount of a polymerization solution to be processed) of methanol, and 8 g of methanol/water (weight ratio 9/1) were put as a poor solvent; 2 g of polymerization solution in the Synthesis Example 1 was added to each of the vials; and then, the vials were agitated to precipitate a resin, and further, a large particle was pulverized by a metal spoon into small pieces. When the amount of methanol was 4 g, the resin was aggregated in a lump at once. The state of the remaining resin after being left to stand still for one day at room temperature was observed. When the amount of methanol was 6 g, the resin was aggregated in a lump. When the amount of methanol was 8 g, a part of the resin was aggregated. When the amount of methanol was 10 g and the amount of water/methanol (weight ratio 9/1) was 8 g, the resin in powder form was not aggregated. Therefore, for precipitation purification, methanol/water (weight ratio 9/1) in an amount which is four times the amount of the crude resin (polymerization solution) was to be employed as a poor solvent.

Example 3

(Precipitation purification) To a purification vessel, 640 g of methanol was added and, while stirring with a stirrer, 200 g of polymerization solution of Synthesis Example 3 was poured thereinto to precipitate a resin in powder form, followed by stirring for 15 minutes. In another vessel, 80 g of methanol and 80 g of water were mixed to generate heat, and cooled to room temperature. 160 g of the methanol/water mixture solution was added to the slurry, and further stirred for 15 minutes. This was filtrated to obtain a wet cake, which was referred to as WC1.
(Rinse purification (first time)) The wet cake WC1 was returned to the purification vessel again, and 600 g of methanol was poured thereto and stirred for 30 minutes. This was filtrated to obtain a wet cake, which was referred to as WC2.
(Rinse purification (second time)) The same operation as the rinse purification (first time) was performed. The obtained wet cake was referred to as WC3.

The amounts of the poor solvent used in the precipitation purification, rinse purification (first time) and rinse purification (second time) are listed on Table 1.

A part of each of the wet cakes WC1, WC2, and WC3 was sampled, and the amount of residual monomer in each process was analyzed by LC analysis. The analysis results are listed on Table 2. The wet cake WC3 was dried under reduced pressure at 40° C. to obtain a dried resin. For the monomer composition ratio of the obtained resin, the analysis results of Mw and Mw/Mn are listed on Table 3.

Comparative Example 3

(Precipitation purification) To a purification vessel, 720 g of methanol and 80 g of water were added and mixed to generate heat, and cooled to room temperature. To the mixture solution of methanol/water, while stirring with a stirrer, 200 g of polymerization solution of Synthesis Example 3 was poured to precipitate a resin in powder form, followed by stirring for 30 minutes. This was filtrated to obtain a wet cake, which was referred to as WC1.
(Rinse purification (first time)) The wet cake WC1 was returned to the purification vessel again, and 600 g of methanol was poured thereinto and stirred for 30 minutes. This was filtrated to obtain a wet cake, which was referred to as WC2.
(Rinse purification (second time)) The same operation as the rinse purification (first time) was performed. The obtained wet cake was referred to as WC3.

The amounts of the poor solvent used in the precipitation purification, rinse purification (first time) and rinse purification (second time) are listed on Table 1.

A part of each of the wet cakes WC1, WC2, and WC3 was sampled, and the amount of residual monomer in each process was measured by LC analysis. The analysis results are listed on Table 2. The wet cake WC3 was dried under reduced pressure at 40° C. to obtain a dried resin. For the monomer composition ratio of the obtained resin, the analysis results of Mw and Mw/Mn are listed on Table 3.

Synthesis Example 4

99 g of monomer C(1-methyl-1-cyclopentyl methacrylate), 57 g of monomer G (gamma butyrolactone methacrylate), 54 g of monomer O (3-hydroxy-1-adamantyl methacrylate) and 7.15 g of 2,2-dimethyl azobis(methylpropionate) were dissolved in 391 g of methyl ethyl ketone to prepare a homogeneous dropping solution. Into a Pyrex (registered trademark) 2 L four-necked flask reaction vessel equipped with a stirrer and a condenser, 98 g of methyl ethyl ketone and 0.79 g of 2,2-dimethyl azobis(methylpropionate) monomer I(2-isopropyl-2-adamantyl methacrylate) were fed, and after keeping the inside of the reaction vessel under nitrogen atmosphere, the solution in the reaction vessel was heated to a temperature of 79° C. The dropping solution which was maintained at a temperature of about 25° C. was each supplied dropwisely to a reaction vessel which was maintained at 79 to 81° C. at a constant rate over four hours each by using a metering pump. After the dropwise addition was completed, the solution was further aged for one hour while maintaining the temperature at 79 to 81° C., and then cooled to room temperature and a polymerization solution was taken out. A part of the polymerization solution was sampled and subjected to an analysis to obtain the results: Mw=11300, Mw/Mn=1.98, and the amount of residual monomer was 8.21% by weight.

Example 4

(Precipitation purification) To a purification vessel, 80 g of hexane and 520 g of methyl tert-butyl ether were added and, while stirring with a stirrer, 200 g of polymerization solution of Synthesis Example 4 was poured thereinto to precipitate a resin in powder form, followed by stirring for 25 minutes. Thereafter, 120 g of hexane and 80 g of methyl tert-butyl ether were added thereto, and further stirred for 5 minutes. This was filtrated to obtain a wet cake, which was referred to as WC1.
(Rinse purification (first time)) The wet cake WC1 was returned to the purification vessel again, and 450 g of hexane and 150 g of methyl ethyl ketone were poured thereto in the order mentioned and stirred for 30 minutes. This was filtrated to obtain a wet cake, which was referred to as WC2.
(Rinse purification (second time)) The same operation as the rinse purification (first time) was performed. The obtained wet cake was referred to as WC3.

The amounts of the poor solvent used in the precipitation purification, rinse purification (first time) and rinse purification (second time) are listed on Table 1.

A part of each of the wet cakes WC1, WC2, and WC3 was sampled, and the amount of residual monomer in each process was analyzed by LC analysis. The analysis results are listed on Table 2. The wet cake WC3 was dried under reduced pressure at 40° C. to obtain a dried resin. For the monomer composition ratio of the obtained resin, the analysis results of Mw and Mw/Mn are listed on Table 3.

Comparative Example 4

(Precipitation purification) To a purification vessel, 200 g of hexane and 600 g of methyl tert-butyl ether were added, and, while stirring with a stirrer, 200 g of polymerization solution of Synthesis Example 4 was poured to precipitate a resin in powder form, followed by stirring for 30 minutes. This was filtrated to obtain a wet cake, which was referred to as WC1.
(Rinse purification (first time)) The wet cake WC1 was returned to the purification vessel again, and 450 g of hexane and 150 g of methyl ethyl ketone were poured thereinto in the order mentioned and stirred for 30 minutes. This was filtrated to obtain a wet cake, which was referred to as WC2.
(Rinse purification (second time)) The same operation as the rinse purification (first time) was performed. The obtained wet cake was referred to as WC3.

The amounts of the poor solvent used in the precipitation purification, rinse purification (first time) and rinse purification (second time) are listed on Table 1.

A part of each of the wet cakes WC1, WC2, and WC3 was sampled, and the amount of residual monomer in each process was measured by LC analysis. The analysis results are listed on Table 2. The wet cake WC3 was dried under reduced pressure at 40° C. to obtain a dried resin. For the monomer composition ratio of the obtained resin, the analysis results of Mw and Mw/Mn are listed on Table 3.

TABLE 1

| | Purification step | | | | | | | | |
|---|---|---|---|---|---|---|---|---|---|
| | Precipitation purification | | | Rinse purification first time | | | Rinse purification second time | | |
| | polymerization solution (g) | poor solvent to be fed in purification vessel (g) | poor solvent added (g) | poor solvent added at first (g) | good solvent added at first (g) | poor solvent added (g) | poor solvent added at first (g) | good solvent added at first (g) | poor solvent added (g) |
| Example 1 | 200 (containing MEK 140) | MeOH 440 | MeOH 360 | MeOH 160 | MEK 40 | MeOH 200 | MeOH 160 | MEK 40 | MeOH 200 |
| Comparative Example 1 | 200 (containing MEK 140) | MeOH 800 | none | MeOH 360 | MEK 40 | none | MeOH 360 | MEK 40 | none |
| Example 2 | 200 (containing MEK 140) | Hex 440 | Hex 360 | Hex 160 | MEK 40 | Hex 200 | Hex 160 | MEK 40 | Hex 200 |
| Comparative Example 2 | 200 (containing MEK 140) | Hex 800 | none | Hex 360 | MEK 40 | none | Hex 360 | MEK 40 | none |
| Example 3 | 200 (containing MEK 140) | MeOH 640 | MeOH 80 Water 80 | MeOH 600 | none | none | MeOH 600 | none | none |
| Comparative Example 3 | 200 (containing MEK 140) | MeOH 720 Water 80 | none | MeOH 600 | none | none | MeOH 600 | none | none |
| Example 4 | 200 (containing MEK 138) | Hex 80 MTBE 520 | Hex 120 MTBE 80 | Hex 450 | MEK 150 | none | Hex 450 | MEK 150 | none |
| Comparative Example 4 | 200 (containing MEK 138) | Hex 200 MTBE 600 | none | Hex 450 | MEK 150 | none | Hex 450 | MEK 150 | none |

\* MEK: methyl ethyl ketone
MeOH: methanol
Hex: hexane
MTBE: methyl tert-butyl ether

TABLE 2

| | residual monomer concentration (LC area %) | | | |
|---|---|---|---|---|
| | polymerization solution immediately after polymerization | precipitation purification WC1 | rinse purification (first time) WC2 | rinse purification (second time) WC3 |
| Example 1 | 9.38 | 1.33 | 0.4 | 0.26 |
| Comparative Example 1 | 9.38 | 1.48 | 1.28 | 1.08 |
| Example 2 | 3.33 | 0.57 | 0.25 | 0.15 |
| Comparative Example 2 | 3.33 | 1.49 | 1.07 | 0.53 |
| Example 3 | 19.0 | 3.8 | 0.78 | 0.13 |
| Comparative Example 3 | 19.0 | 5.09 | 1.41 | 0.35 |
| Example 4 | 8.21 | 0.80 | 0.11 | 0.02 |
| Comparative Example 4 | 8.21 | 1.16 | 0.38 | 0.18 |

TABLE 3

| | copolymer composition ratio (mole %) | | | | | | | | |
|---|---|---|---|---|---|---|---|---|---|
| | E | I | C | Ad | Na | N | G | O | Mw | Mw/Mn |
| Example 1 | 50 | | | | 50 | | | | 8400 | 1.82 |
| Comparative Example 1 | 50 | | | | 50 | | | | 8400 | 1.86 |
| Example 2 | | | | 34 | | 21 | 30 | 15 | 9500 | 1.92 |
| Comparative Example 2 | | | | 34 | | 21 | 30 | 15 | 9400 | 1.97 |
| Example 3 | | 40 | | | | | 42 | 18 | 7800 | 1.80 |
| Comparative Example 3 | | 40 | | | | | 42 | 18 | 7700 | 1.87 |
| Example 4 | | | 49 | | | | 30 | 21 | 13000 | 1.56 |
| Comparative Example 4 | | | 49 | | | | 30 | 21 | 12300 | 1.62 |

According to the present invention, by using the same amount of solvent or the same number of processes as in a conventional method, the amount of residual monomer in a resin can be reduce to not more than half. Alternatively, when the amount of the residual monomer can be about the same amount as in the conventional method, the number of purification can be reduced, and it becomes possible to reduce the manufacturing cost.

The invention claimed is:

1. A method for purifying a resin for photolithography, the method comprising:
    an operation (a) wherein a slurry in which a resin is dispersed in a solution containing a good solvent and a poor solvent is stirred, wherein the resin is produced by a polymerization of at least one monomer having an ethylenic double bond selected from the group consisting of a styrene structure, an acrylate structure and a norbornene structure; and
    then an operation (b) wherein a poor solvent is added to said slurry to lower the ratio of the good solvent to the poor solvent, and then, the resin is separated from the solution.

2. The method for purifying a resin for photolithography according to claim 1, wherein the resin in the operation (a) is produced from a polymerization solution after polymerization reaction.

3. The method for purifying a resin for photolithography according to claim 1, wherein the operation (a) is an operation wherein the slurry which is produced by bringing a polymerization solution after polymerization reaction into contact with a poor solvent is stirred.

4. The method for purifying a resin for photolithography according to claim 1, wherein the operation (a) is an operation wherein the slurry which is produced by bringing a polymerization solution after polymerization reaction into contact with a poor solvent is stirred, and in the operation (b), an amount of poor solvent added to the slurry is not less than 20% by weight of a total amount of the poor solvent used in the operation (a) and the operation (b).

5. The method for purifying a resin for photolithography according to claim 1, wherein the operation (a) is an operation wherein the slurry produced by mixing a resin with a solution containing a good solvent and a poor solvent is stirred, wherein said resin is produced by solid-liquid separating a precipitate produced by bringing a polymerization solution after polymerization reaction into contact with a poor solvent.

6. The method for purifying a resin for photolithography according to claim 1, wherein the operation (a) is an operation wherein the slurry produced by mixing a resin with a solution containing a good solvent and a poor solvent is stirred, wherein said resin is produced by solid-liquid separating a precipitate produced by bringing a polymerization solution after polymerization reaction into contact with a poor solvent, and an amount of poor solvent in the operation (b) is not less than 40% by weight of a total amount of poor solvents used in the operation (a) and the operation (b).

7. The method for purifying a resin for photolithography according to claim 1, wherein the poor solvent added in the operation (b) comprises water.

8. The method for purifying a resin for photolithography according to claim 1, wherein said resin is a powder.

9. A method for producing a resin for photolithography comprising the method for purifying a resin for photolithography according to claim 1.

10. The method for purifying a resin for photolithography according to claim 2, wherein the operation (a) is an operation wherein the slurry which is produced by bringing a polymerization solution after polymerization reaction into contact with a poor solvent is stirred.

11. The method for purifying a resin for photolithography according to claim 2, wherein the operation (a) is an operation wherein the slurry which is produced by bringing a polymerization solution after polymerization reaction into contact with a poor solvent is stirred, and in the operation (b), an amount of poor solvent added to the slurry is not less than 20% by weight of a total amount of the poor solvent used in the operation (a) and the operation (b).

12. The method for purifying a resin for photolithography according to claim 2, wherein the operation (a) is an operation wherein the slurry produced by mixing a resin with a solution containing a good solvent and a poor solvent is stirred, wherein said resin is produced by solid-liquid separating a precipitate produced by bringing a polymerization solution after polymerization reaction into contact with a poor solvent.

13. The method for purifying a resin for photolithography according to claim 2, wherein the operation (a) is an operation wherein the slurry produced by mixing a resin with a solution containing a good solvent and a poor solvent is stirred, wherein said resin is produced by solid-liquid separating a precipitate produced by bringing a polymerization solution after polymerization reaction into contact with a poor solvent, and an amount of poor solvent added in the operation (b) is not less than 40% by weight of a total amount of poor solvents used in the operation (a) and the operation (b).

14. The method for purifying a resin for photolithography according to claim 2, wherein the poor solvent added in the operation (b) comprises water.

15. The method for purifying a resin for photolithography according to claim 2, wherein said resin is a powder.

16. A method for producing a resin for photolithography comprising the method for purifying a resin for photolithography according to claim 2.

* * * * *